US008826515B2

(12) United States Patent
Lam et al.

(10) Patent No.: US 8,826,515 B2
(45) Date of Patent: Sep. 9, 2014

(54) SELF-ALIGNED COIL PROCESS IN MAGNETIC RECORDING HEADS

(75) Inventors: Terence Tin-Lok Lam, Cupertino, CA (US); David Kaimon Lee, San Jose, CA (US); Edward Hin Pong Lee, San Jose, CA (US); Changqing Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 658 days.

(21) Appl. No.: 12/753,620

(22) Filed: Apr. 2, 2010

(65) Prior Publication Data

US 2010/0187199 A1 Jul. 29, 2010

Related U.S. Application Data

(62) Division of application No. 11/243,731, filed on Oct. 4, 2005, now abandoned.

(51) Int. Cl.
*G11B 5/17* (2006.01)
*G11B 5/187* (2006.01)

(52) U.S. Cl.
USPC .............. 29/603.25; 29/603.24; 29/603.11; 29/603.13; 360/123.4; 360/123.46; 360/123.49; 360/313; 428/811.2

(58) Field of Classification Search
USPC .............. 29/603.13, 603.23, 603.24, 603.25, 29/603.11; 360/123.4, 123.46, 123.49, 360/313, 317, 123.55; 428/811, 811.2
See application file for complete search history.

(56) References Cited

U.S. PATENT DOCUMENTS

| 5,728,595 | A | 3/1998 | Fukase |
| 5,875,080 | A * | 2/1999 | Seagle .................... 29/603.24 X |
| 6,163,436 | A * | 12/2000 | Sasaki et al. ......... 360/125.55 X |
| 6,304,414 | B1 | 10/2001 | Crue, Jr. et al. |
| 6,466,402 | B1 | 10/2002 | Crue, Jr. et al. |
| 6,466,415 | B1 * | 10/2002 | Terunuma et al. ............ 360/317 |
| 6,693,769 | B2 * | 2/2004 | Hsu et al. ............. 360/123.49 X |
| 6,696,226 | B1 * | 2/2004 | Dinan et al. ........... 29/603.25 X |
| 6,804,879 | B2 | 10/2004 | Hsiao |
| 2003/0164354 | A1 | 9/2003 | Hsieh et al. |
| 2003/0170976 | A1 | 9/2003 | Molla et al. |
| 2003/0200647 | A1 * | 10/2003 | Kamijima .............. 29/603.25 X |
| 2004/0070872 | A1 | 4/2004 | Hsu et al. |
| 2004/0103523 | A1 * | 6/2004 | Yamada ................. 29/603.23 X |
| 2004/0173912 | A1 | 9/2004 | Rhodes |

FOREIGN PATENT DOCUMENTS

JP 2003242609 A * 8/2003

* cited by examiner

*Primary Examiner* — A. Dexter Tugbang
(74) *Attorney, Agent, or Firm* — Maryam Imam; IPxLAW Group LLP

(57) ABSTRACT

A write head includes a first pole P1, a P1 pedestal, a first back gap layer plated on top of the first pole P1 leaving a region between the P1 pedestal and the first back gap layer for plating a coil. Further, a first insulation layer is applied on top of the P1 pedestal and the first back gap layer and the region between the P1 pedestal and the first back gap layer. The write head further includes a coil, patterned at least partially on top of the P1 pedestal and the first back gap layer and the region between the P1 pedestal and the first back gap layer, copper plated in the coil patterns, and a second insulation layer is applied to fill the spaces in between the coil turns. The resulting structure is planarized via chemical mechanical polishing.

8 Claims, 17 Drawing Sheets

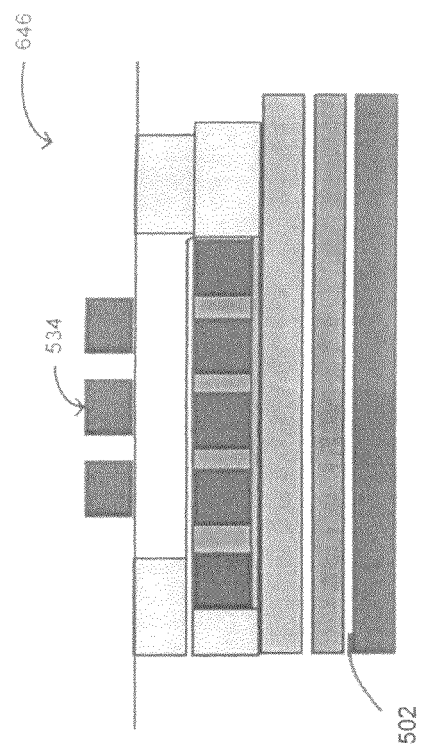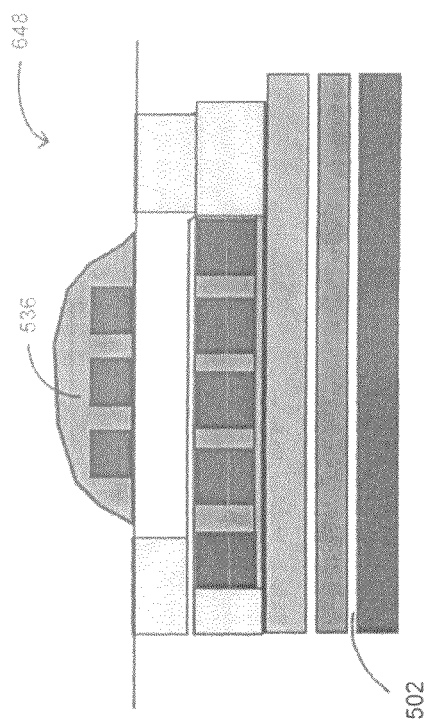

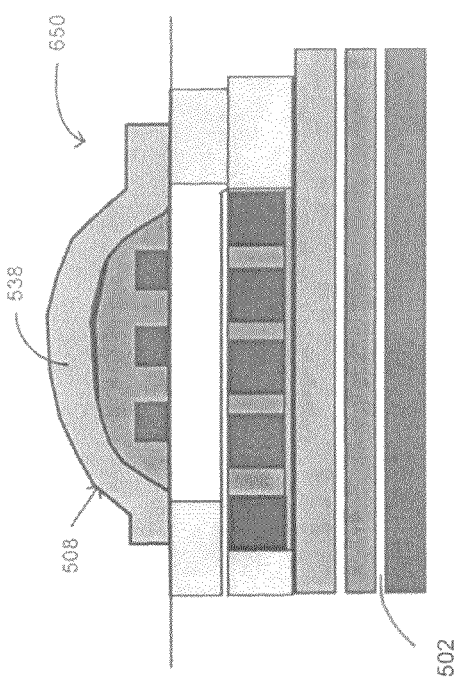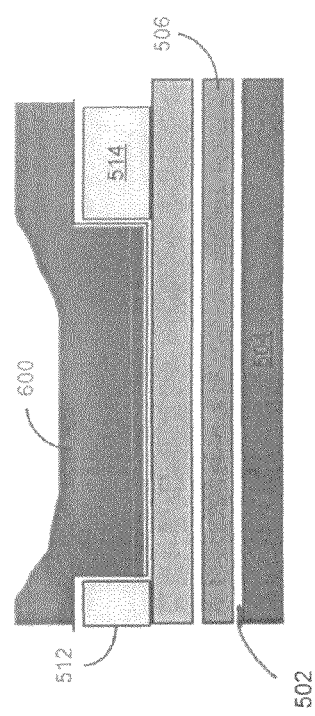

SELF-ALIGNED COIL PROCESS IN MAGNETIC RECORDING HEADS

CROSS REFERENCE TO RELATED APPLICATION

This application is a divisional application of U.S. patent application Ser. No. 11/243,731, filed on Oct. 4, 2005, entitled "SELF-ALIGNED COIL PROCESS IN MAGNETIC RECORDING HEADS", by Terence Tin-Lok Lam, et al., which is a continuation-in-part of prior U.S. patent application Ser. No. 10/652,878, filed on Aug. 29, 2003, entitled "Method For Patterning A Self-Aligned Coil Using A Damascene Process", the disclosures of which are incorporated herein by reference, as though set forth in full.

BACKGROUND OF THE INVENTION

1. Field of the Invention

This invention relates generally to the field of magnetic recording heads having coils inducing magnetic flux for writing on a magnetic medium (such as a magnetic disc) and more particularly, to recording heads having coils that are self-aligned and with low resistance yet utilizing conventional processing techniques for manufacturing thereof.

2. Description of the Prior Art

Magnetic hard drives (or disc drives) have been in common use for storage of large groups of data for decades. Improvements in manufacturing thereof have attracted popular attention particularly to reducing the size of the drive and/or its internal components to achieve both lower costs and wider applications.

Magnetic hard drives include magnetic recording head for reading and writing of data. As well known, a magnetic recording head generally includes two portions, a write head portion or head for writing or programming magnetically-encoded information on a magnetic media or disc and a reader portion for reading or retrieving the stored information from the media.

Data is written onto a disc by a write head that includes a magnetic yoke having a coil passing there through. When current flows through the coil, a magnetic flux is induced in the yoke, which causes a magnetic field to fringe out at a write gap in a pole tip region. It is this magnetic field that writes data, in the form of magnetic transitions, onto the disk. Currently, such heads are thin film magnetic heads, constructed using material deposition techniques such as sputtering and electroplating, along with photolithographic techniques and wet and dry etching techniques.

Examples of such thin film heads include a first and second magnetic poles connected through a back gap forming a horseshoe structure and having a pole tip region and a back gap region, formed of a material such as NiFe which might be plated onto a substrate after sputter depositing an electrically conductive seed layer. Opposite the pole tip region, at a back end of the magnetic pole, a magnetic back gap can be formed. A back gap is the term generally used to describe a magnetic structure that magnetically connects the first and second poles to form a completed magnetic yoke as will be described.

One or more electrically conductive coils can be formed over the first pole, between a pedestal, positioned above a portion of the first pole, and the back gap and can be electrically isolated from the pole and yoke by an insulation layer, which could be alumina ($Al_2O_3$) or hard baked photoresist.

With reference to FIG. 1, a plan view of an exemplary write element 302 can be seen in relation to the slider 111. A coil 304, passing through a magnetic yoke 306, induces a magnetic flux in the yoke 306. The gap in the yoke 306, in turn causes a magnetic field to fringe out at the pole tip 308. It is this fringing field 310 that writes magnetic signals onto a nearby magnetic medium.

With reference now to FIG. 2, a magnetic head 400 according to one possible embodiment of the present invention has magnetic read element 402 formed between the first and second magnetic shields, 404 and 406. A write head, generally referred to as 408, includes a first pole P1 410. A P1 pedestal 412, disposed in a pole tip region 413 and a first back gap layer 414, at an opposite end, are formed over the first pole. The first pole 410, P1 pedestal 412, and back gap 414 are formed of a magnetic soft material such as, for example, NiFe. A first coil insulation layer 416 is formed over the first pole 410 between the P1 pedestal 412 and back gap layer 414. An electrically conductive coil 418, shown in partial cross section in FIG. 2, passes over the first pole 410 on top of the first insulation layer 416. A second coil insulation layer 420 insulates each turn of the coil 418 from the other and insulates the coil from the rest of the write head 408.

With continued reference to FIG. 2, a thin layer of non-magnetic write gap layer 424 is deposited over the coil 418, insulation layer 420 and P1 pedestal 412, and extends to an air bearing surface (ABS) 426 at one end and stops short of extending completely over the top of the back gap layer 414 at the other end. A magnetic second back gap material layer 428 may be formed over the top of the back gap layer 414, being magnetically connected therewith. The ABS is the surface of the magnetic head designed such that it enables the magnetic head to ride on a cushion of air between the head and the disc along the disc surface.

With continued reference to FIG. 2, a P2 pole tip 430 is provided on top of the write gap layer 424 in the pole tip region 413. The P2 pole tip 430 extends to the ABS 426, and has a width (into the plane of the page of FIG. 2) that defines a track width of the write head 408. The P2 pole tip is constructed of a magnetic material, and is preferably constructed of a soft magnetic material having a high magnetic saturation (high Bsat) and low coercivity.

With reference still to FIG. 2, a dielectric fill material, or layer 433, such as alumina, extends from the P2 pole tip 430 to the second back gap layer 428. The P2 pole tip 430 and the second back gap layer 428 may be formed at the same time or during the same step of processing, alternatively, they may be formed separately, as disclosed hereinabove. A second coil 434 may sit atop the dielectric layer 433, and is insulated by an insulation layer 436, which could be for example hard baked photoresist. A P3 magnetic layer 438 is formed above the second coil 434 and the insulation layer 436 and extends from the P2 pole tip 430 to the second back gap layer 428 being magnetically connected with both. The P3 magnetic layer 438 forms the majority of a second pole of the magnetic yoke of the write head 408.

The pole tip region 413, the P3 magnetic layer 438 and the back gap 414 form the magnetic yoke (or yoke) referred to in the foregoing and below. It is desirable to maintain a short yoke length to keep the magnetic path short and thus to minimize magnetic leakage and to achieve high data rate for better performance. It is through the write gap 424 that the field 310 (in FIG. 1) fringes to write magnetic signals onto the medium or disc.

In the prior art write head 400, the P2 pole tip 430 is shown residing below the P3 magnetic layer 438 and in fact, connected thereto. In other prior art write heads, the P2 pole tip 430 extends all the way across forming a P2 layer without the P3 magnetic layer 438.

As those skilled in the art will appreciate, the coil 418 and the second coil 434 are critical elements of the write or recording head because they form the coil 304 of FIG. 1, passing through the magnetic yoke 306 (in FIG. 1), to induce a magnetic flux in the yoke 306. The magnetic flux in the yoke 306, in turn, causes a magnetic field to fringe out at the pole tip 308, as earlier discussed. It is this fringing field 310 that writes magnetic signals onto a nearby magnetic medium. The problem with prior art write heads is that since it is desirable to keep the yoke length short, the coil (coils 418 and 434) needs to be narrow in an effort to attain an appropriate number of turns of the coil. The narrowness of the coil causes the coil resistance to be high. Therefore, the write head can become hotter during write operations thereby causing expansion and protrusion of the write head. This protrusion is likely to cause the write poles to protrude too close to the disc, potentially causing scratching of the disc. Additionally, in current write head designs, the coils 418 and 434 are carefully aligned, in large part, due to the nature of manufacturing the same, i.e. first building insulation and then depositing the coils. Therefore, the spaces between the first coil turn and the P1 pedestal 412 and the last coil turn and the back gap layer 414 have to be kept large enough to avoid shorting between the coil and the yoke.

Therefore, the need arises for a write head of a disc drive to have a coil wide or thick enough to have low resistance and manufactured to be self-aligned to avoid protrusion of the write head yet manufactured using the same tools as used in manufacturing prior art write heads.

SUMMARY OF THE INVENTION

Briefly, in one embodiment of the present invention, a write head includes a first pole P1, a P1 pedestal (P1P) and, a first back gap layer plated on top of the first pole P1 leaving a region between the P1 pedestal and the first back gap layer for plating a coil, a first insulation layer applied on top of the P1 pedestal and the first back gap layer and the region between the P1 pedestal and the first back gap layer. The write head further includes a coil, patterned at least partially on top of the P1 pedestal and the first back gap layer and the region between the P1 pedestal and the first back gap layer, copper plated in the coil patterns, and a second insulation layer applied to fill the spaces in between the coil turns. The resulting structure is planarized via chemical mechanical polishing.

IN THE DRAWINGS

FIGS. 7A-7F show additional steps needed to complete the fabrication of the write head 508.

FIGS. 8A-8F show the relevant steps for an alternative method for fabrication of the coil 624.

DETAILED DESCRIPTION OF THE PREFERRED EMBODIMENT

The following description is an embodiment presently contemplated for carrying out this invention. This description is made for the purpose of illustrating the general principles of this invention and is not meant to limit the inventive concepts claimed herein.

Figure 3:
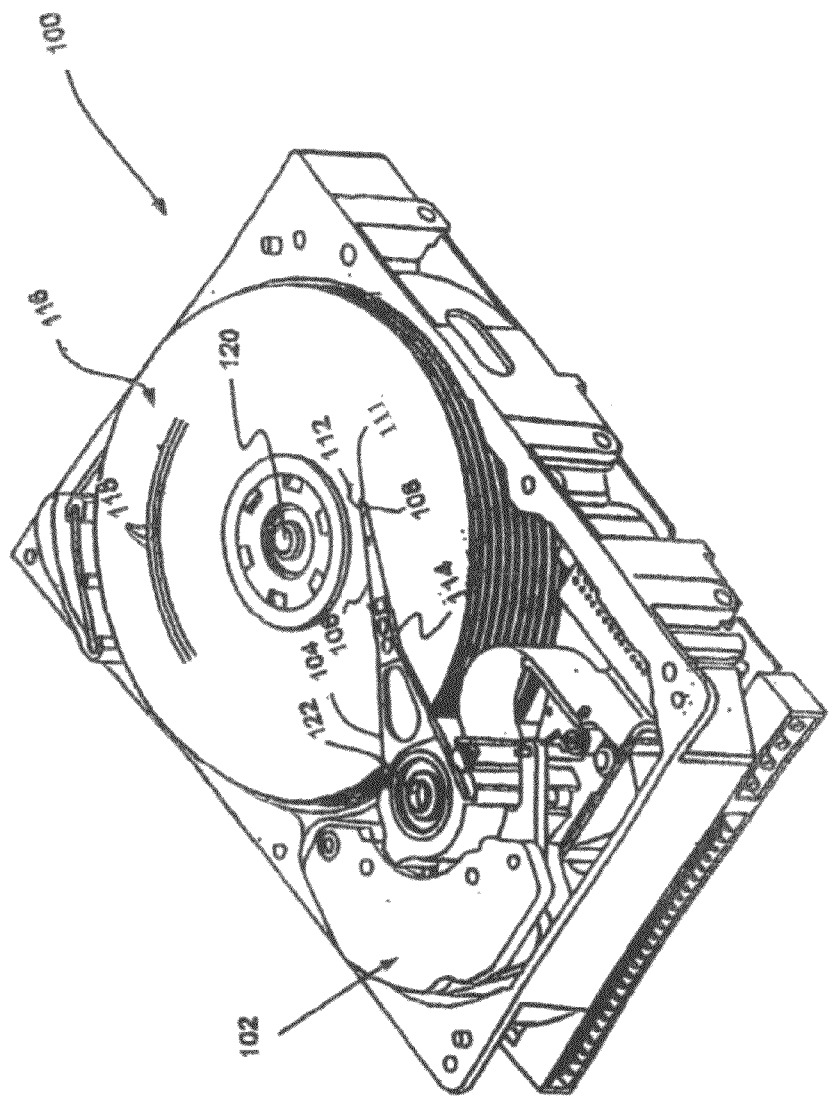
FIG. 3 shows a top perspective view of a disc drive 100 embodying this invention is shown in accordance with an embodiment of the present invention.

Referring now to FIG. 3, a top perspective view of a disc drive 100 embodying this invention is shown in accordance with an embodiment of the present invention. The disc drive 100 is shown to include a voice coil motor (VCM) 102, an actuator arm 104, a suspension 106, a flexure 108, a slider 111, a read-write head 112, a head mounting block 114, and magnetic disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the head 112, which will be discussed in greater detail with respect to further figures. This process may be used in perpendicular/longitudinal designs and either single or dual layer coils.

During operation of the disc drive 100, rotation of the disc 116 generates an air cushion which is encountered by the slider 111. This air cushion acts to keep the slider 111 afloat a small distance above the surface of the disc 116, allowing the slider 111 to fly above the surface of the disc 116. The VCM 102 is selectively operated to move the actuator arm 104 around the axis 120, thereby moving the suspension 106 and positioning the transducing head (not shown), which includes a main pole (not shown), by the slider 111 over the tracks 118 of the disc 116. It is imperative to position the transducing head properly to read and write data from and to the concentric tracks 118.

Figure 4:
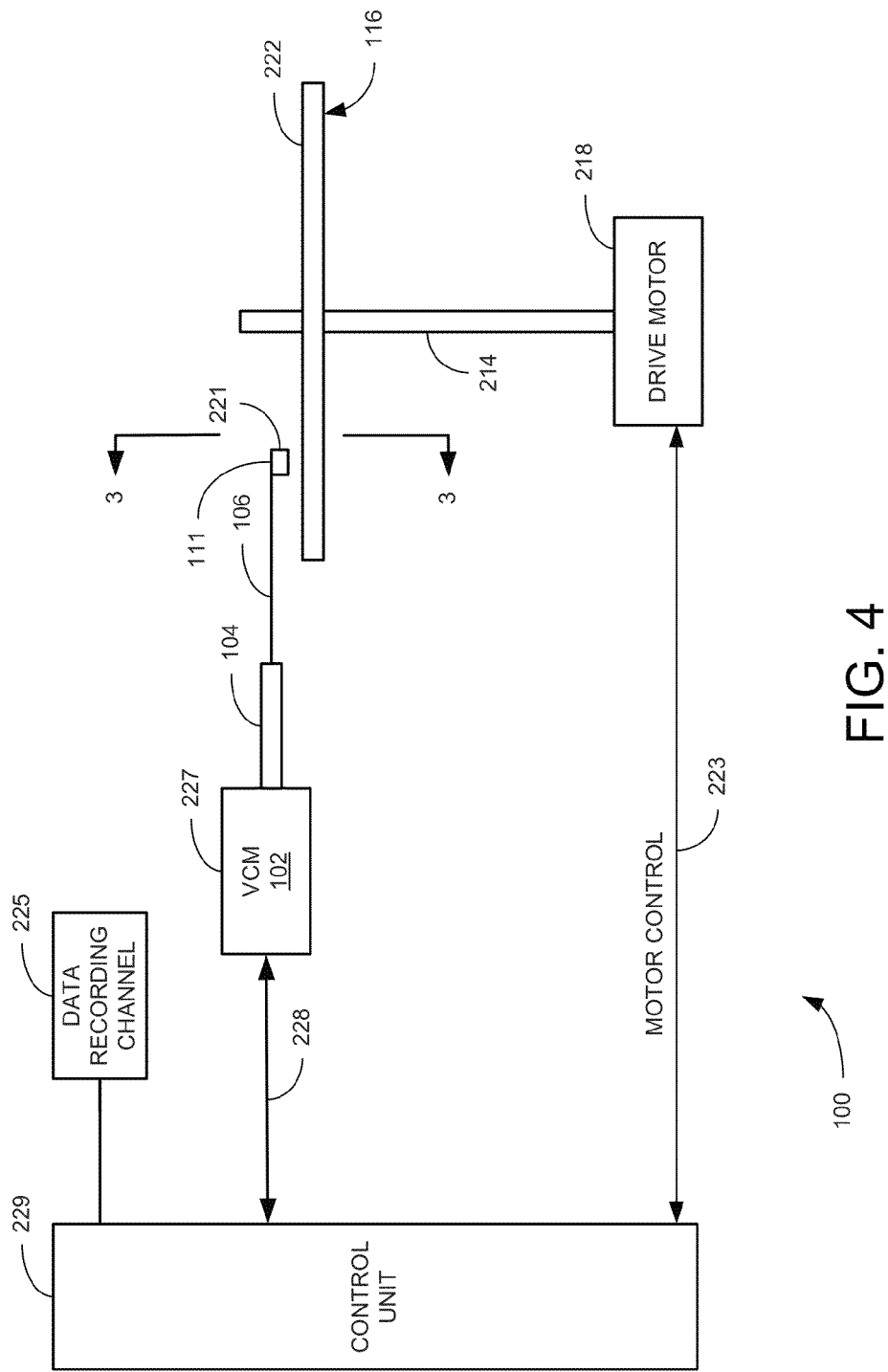
FIG. 4 shows further structures of the disc drive 100 in accordance with an embodiment of the present invention.

With reference now to FIG. 4, further structures of the disc drive 100 are shown in accordance with an embodiment of the present invention. As shown in FIG. 4, at least one rotatable magnetic disc 116 is supported on a spindle 214 and rotated by a disc drive motor 218. The magnetic recording on each disc is in the form of an annular pattern of concentric data tracks (not shown in FIG. 4) on the disc 116.

Figure 1:
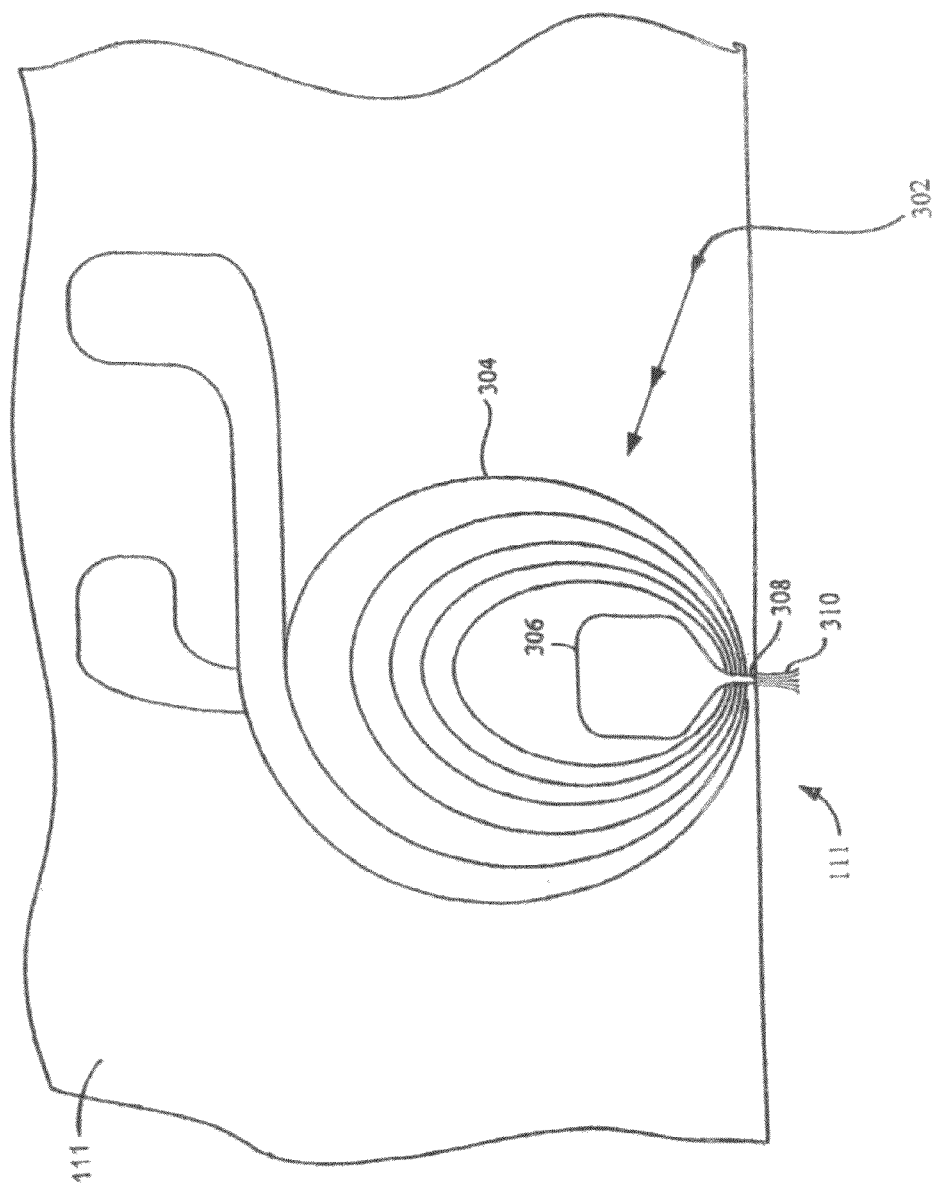
FIG. 1 illustrates a plan view of an exemplary prior art write element 302 that can be seen in relation to the slider 111.
Figure 2:
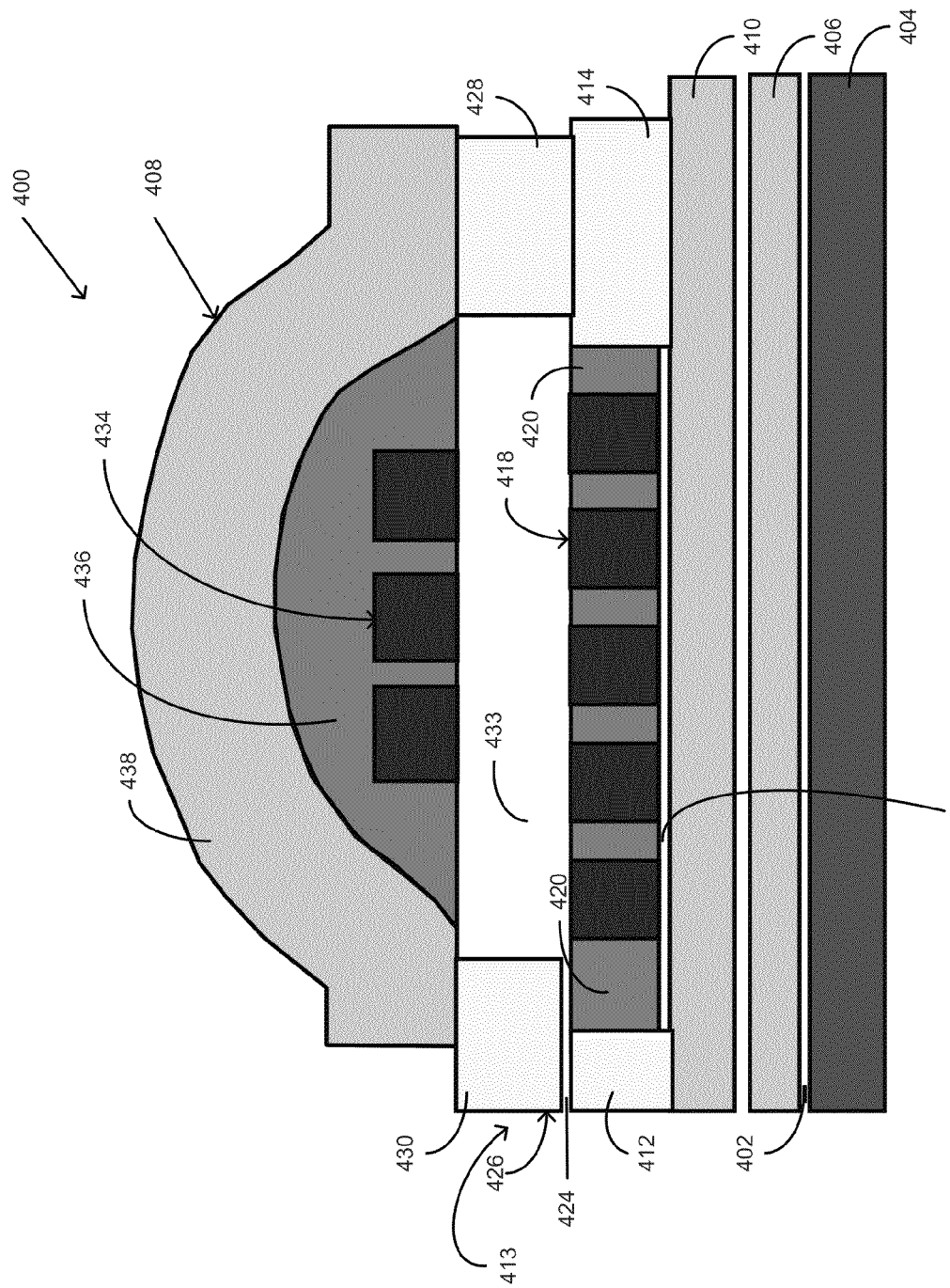
FIG. 2 shows a magnetic head 400 according to the prior art having a magnetic read element and a magnetic write element.

At least one slider 111 is positioned near the magnetic disc 116, each slider 111 supporting one or more magnetic head assemblies 221. As the magnetic disc rotates, the slider 111 is moved radially in and out over the disc surface 222 so that the magnetic head assembly 221 may access different tracks of the magnetic disc where desired data are written. Each slider 111 is attached to the actuator arm 104 by way of a suspension 106. The suspension 106 provides a slight spring force which biases slider 111 against the disc surface 222. Each actuator arm 104 is attached to an actuator means 227. The actuator means 227, as shown in FIG. 2, may be the VCM 102. The VCM 102 comprises a coil movable within a fixed magnetic field, the direction and speed of the coil movements being controlled by the motor current signals supplied by the controller 229.

During operation of the disc storage system or disc drive 100, the rotation of the disc 116 generates an air bearing between the slider 111 and the disc surface 222 which exerts an upward force or lift on the slider. The air bearing thus counter-balances the slight spring force of the suspension 106 and supports the slider 111 off and slightly above the disc surface by a small, substantially constant spacing during normal operation.

The various components of the disc storage system are controlled in operation by control signals generated by the control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 111 to the desired data track on the disc 116. Write and read signals are communicated to and from write and read heads 221 by way of recording channel 225.

The above description of a typical magnetic disk storage system and the accompanying illustration of FIG. 4 are for representation purposes only. It should be apparent that disc storage systems may contain a large number of discs and actuators, and each actuator may support a number of sliders. It should be noted that the term "disc", as used herein, is the same as the term "disk", as known to those of ordinary skill in the art, in fact, the terms "disc" and "disk" are used interchangeably herein.

Figure 5:
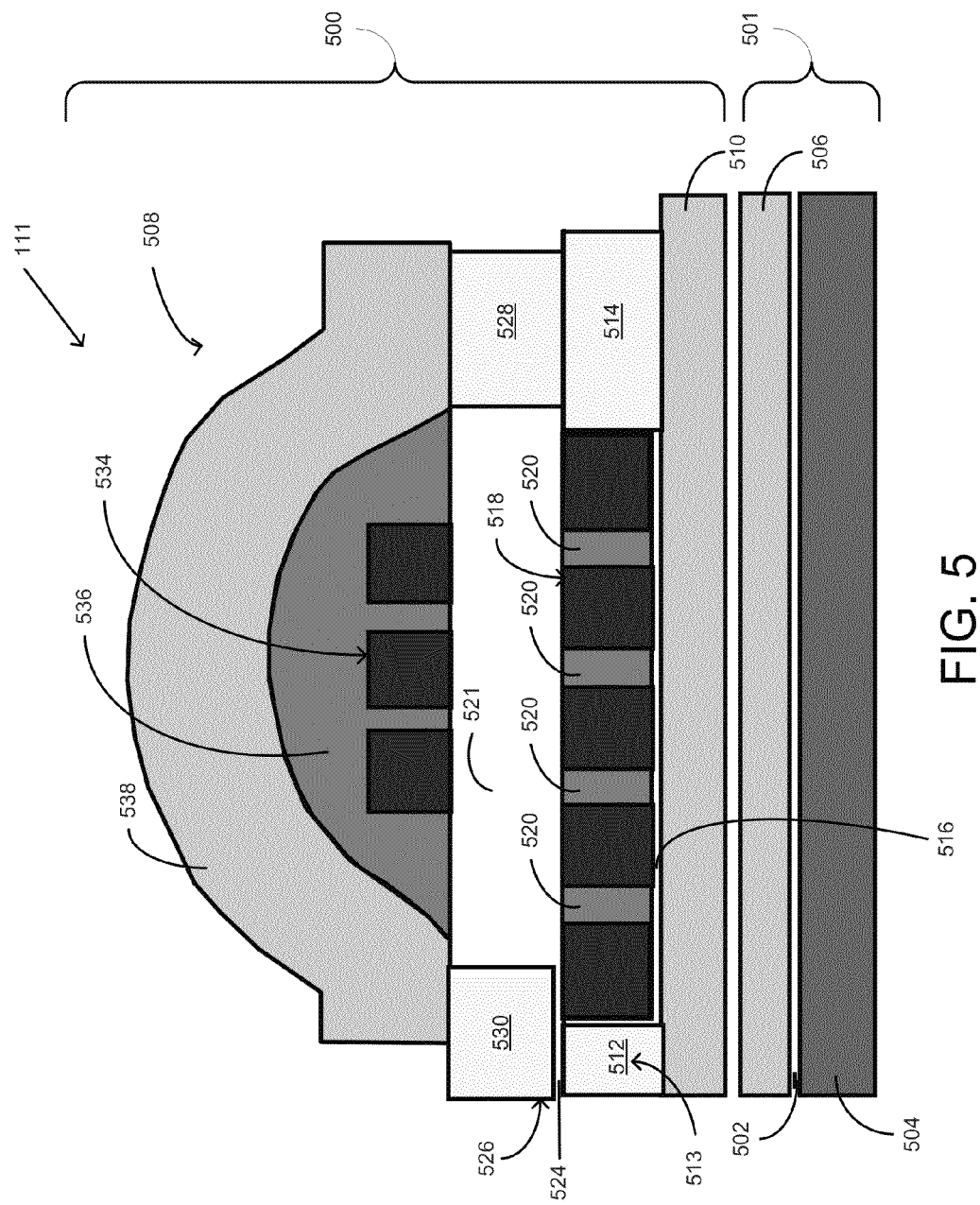
FIG. 5 shows a plan view of an exemplary magnetic write (or recording) head 500 in accordance with an embodiment of the present invention.

This invention provides a new structure as well as a method of improving the fabrication of a portion of the write head. With reference to FIG. 5, a plan view of an exemplary magnetic write (or recording) head 500 and read head 501 is shown in accordance with one embodiment of the present invention. To provide perspective, the write head 500 and the read head 501 are a part of the slider 111 of FIG. 3, operational in a disc drive, such as the disc drive 100.

The read head 501 is shown to include magnetic read element 502 sandwiched between first and second magnetic shields, 504 and 506. A write head, generally referred to as 508, includes a first pole P1 510. A P1 pedestal 512 disposed at the air bearing surface (ABS) 526 and a first back gap layer 514, at an opposite end, are formed over the first pole. The first pole 510, P1 pedestal 512, and back gap 514 are formed of a magnetic material such as for example NiFe. A first coil insulation layer 516 is formed over the first pole 510 between the P1 pedestal 512 and the back gap layer 514. In one method of manufacturing the write head 500, the back gap layer 514 is made at the same time as the P1 pedestal 512. However, in other methods of manufacturing the same, the back gap layer 514 is made separately. In one embodiment of the present invention, the back gap layer 514 may be made of nickel iron (NiFe) alloys, cobolt iron (CoFe) alloys, or cobolt iron nickel (CoFeNi) alloys. An electrically conductive coil layer 518, shown in partial cross section in FIG. 5, is plated over the first pole 510 on top of the first barrier/seed insulation layer 516, into the coil pockets (reference number 518 refers to the coil pockets after they have been filled with the coil layer). The coil material may be deposited in the coil pockets by plating or other deposition techniques. The coil turns induce a magnetic flux in the yoke which is used to generate the write filed used to record magnetic transitions on the media. The number of coil turns is dependent on the specifics of the design of the head. The greater the number of turns, the greater the generated flux but also greater inductance and resistance (since each coil turn has to be narrower). One solution to this problem is presented in the U.S. patent application Ser. No. 10/652,878, by the same inventors, filed on Aug. 29, 2003, entitled "Method For Patterning A Self-Aligned Coil Using A Damascene Process", the disclosure of which is incorporated herein by reference, as though set forth in full.

In one embodiment of the present invention, the first insulation layer 516 is made by the deposition of a layer of alumina ($Al_2O_3$) or silicon dioxide ($SiO_2$) followed by the deposition of a seed layer (e.g. Rhodium), and the coil 518 is made of copper. A second coil insulation layer 520 insulates the turns of the coil 518 from one another and insulates the coil from the rest of the write head 508. In one embodiment of the present invention, the second coil insulation layer 520 is hard baked photoresist.

The embodiment of FIG. 5 presents a non-damascene structure and method of manufacturing the same for reducing recession of the P1 pedestal, as will be evident shortly. However, a brief discussion of the advantage of the write head 500 and manufacturing thereof over that of a damascene method is presented. In damascene techniques, various ways of manufacturing coil within coil pockets that are self-aligned are employed but these methods require added effort and more extensive manufacturing details that are not required by the embodiments of the present invention. The damascene technique of coil formation may require for example, a tri-layer method including an imaging layer, a dielectric layer, and hard bake resist. An alternative embodiment may consist of a bi-layer method including an imaging layer and dielectric layer. However, the manufacturing of the write head 500 according to one aspect of the present invention does not require the complexities of the damascene technique and at the same time it allows for the formation of self-aligned coils with lower resistance due to a more efficient use of the small space between the P1 pedestal 512 and the back gap 514. The more efficient use of the space between the P1 pedestal 512 and the back gap 514 allows for the formation of copper coils that occupy a larger percentage of the area available, leading to lower resistance and inductance for a given number of coil turns. Also, the proximity of the last coil turn behind the P1 pedestal strengthens P1 pedestal and offers better protection against P1 pedestal 512 sinking in during subsequent processing steps following the formation of P1 pedestal 512.

With continued reference to FIG. 5, a thin layer of non-magnetic write gap layer 524 is deposited over the coil 518, insulation layers 520 and P1 pedestal 512, and extends to an air bearing surface (ABS) 526 at one end and stops short of extending completely over the top of the back gap layer 514 at the other end. A magnetic second back gap material layer 528 may be formed over the top of the back gap layer 514, being magnetically connected therewith. The ABS is the surface of the magnetic head designed such that it enables the magnetic head to ride on a cushion of air between the head and the disc along the disc surface.

With continued reference to FIG. 5, a P2 pole tip 530 is provided on top of the write gap layer 524 in the pole tip region 513. The P2 pole tip 530 extends to the ABS 526, and has a width (into the page of FIG. 5) that defines a track width of the write head 508. The P2 pole tip is constructed of a magnetic material, and is preferably constructed of a soft magnetic material having a high magnetic saturation (high Bsat), and low coercivity and a high magnetic moment.

With reference still to FIG. 5, a dielectric material or layer 521, such as alumina, extends from the P2 pole tip 530 to the second back gap layer 528. A second coil 534 sits atop the dielectric layer, and is insulated by an insulation layer 536, which could be, for example, hard baked photoresist. A P3 magnetic layer 538 is formed above the second coil 534 and the insulation layer 536 and extends from the P2 pole tip 530 to the second back gap layer 528 being magnetically connected with both. Further details of the process for manufacturing the write head 508 are presented shortly relative to other figures.

As noted in a comparison of FIGS. 5 and 2, the coil 518 has a larger cross section area than that of the coil 418 because part of the insulation layer 420 of FIG. 2 is replaced with the coil 518 of FIG. 5. Thus, the coil 518 is lower in resistance than the coil 418, which is desirable for reasons, discussed hereinabove. Viewed from a conductivity standpoint, the conductivity of the area below the write gap layer 524 and above the pole P1 510 is increased by 20 to 40% due to the coil 518 having a larger cross section area. The more efficient use of the space between the P1 pedestal 512 and the back gap 514 allows for the formation of copper coils that occupy a larger percentage of the area available, leading to lower resistance and inductance for a given number of coil turns. Another an aspect of an embodiment of the invention may be based on the ratio of conductive material to non-conductive material between P1 pedestal 512 and the back gap 514, above the P1 pole layer 510 and below the insulation layer 521. At least one embodiment of the present invention provides for a greater ratio of the space described above occupied by conductive material of the coil (e.g. copper) versus the non-conductive insulation material 520 (e.g. A103). This ratio will vary with each design (yoke length) and the number of coil turns required, but for a given design and corresponding number of coil turns, the ratio of the area occupied by the coil turns divided by the area occupied by insulation is higher than the conventional methods of prior art. Furthermore, during manufacturing of the write head and specifically during aggressive cleaning and after the ABS is exposed, in prior art techniques, the P1 pedestal is, at times, known to sink.

For example, in FIG. 5, the P1 pedestal 512 does not sink because metal rather than hard baked photoresist is behind it, i.e. the coil 518 is located in place of the insulation layer 420 that is behind or next to the P1 pedestal 512, which as earlier mentioned reduces or eliminates occurrences of disc scratching and damage.

Another advantage of an embodiment according to the present invention is based on the fact that the protrusion of the magnetic poles and shields at the ABS is reduced in an embodiment of the present invention because the write head is cooler during write operations. Protrusion is reduced by packing more copper versus insulation material into the area between the P1 pedestal 512 and the back gap 514 (area into which copper is plated). As current is applied into the coil, protrusion is reduced if more copper is packed into the coil pocket. Based on ohm's law, resistance is inversely proportional to the copper thickness. Therefore, an increase in the coil line width results in lower resistance that leads to lower heat generation and therefore reduced protrusion.

Moreover, the same tools and processes that are utilized to manufacture the write head 408 of FIG. 2 are used to manufacture the write head 508 of FIG. 5 thereby avoiding increased manufacturing costs. That is, no further tooling is needed to manufacture the write head 508 of FIG. 5 while the latter offers performance improvements over the write head 408 of FIG. 2.

For example, as a comparison to the use of damascene process, the latter uses photolithography tool, reactive ion etch tool, copper plating tool and CMP tool to form the coil. The non-damascene coil process of the present invention only uses photolithography tool and copper plating tool.

The coil 518, illustrated in FIG. 5, more efficiently utilizes the space in the coil pocket and provides regular coil spacing. More copper for the coils 610 is packed for coil turn. Moreover, the likelihood of pole tip protrusions is diminished because by maximizing the copper forming the coil turns, the write head operates at a lower temperature.

The coil 518 of FIG. 5 is formed using a self-aligned non-damascene process. This process may be used in perpendicular/longitudinal designs and either single or dual layer coils. Moreover, protrusions are further reduced by maximizing the copper in the coil turns.

Remaining figures will now be discussed to provide further details of the steps for manufacturing the write head 508.

Figure 6A:
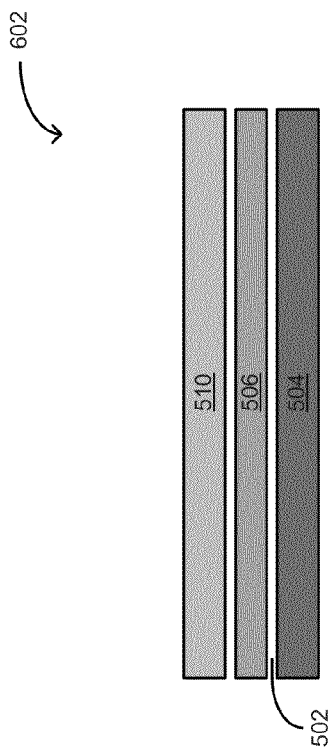
FIGS. 6A-6I show some of the relevant steps for processing or manufacturing of the write head 508 of FIG. 5.

FIGS. 6A-6I show some of the relevant steps for processing or manufacturing the write head 508. In FIG. 6A, the build-up of the first pole P1 510 is shown, at step 602. As seen from FIG. 6A, a first reader shield 504 is formed, in one embodiment by plating. Then a first reader gap made of magnetically insulting material is deposited (not shown here), next after a CMP process, the read sensor 502 is formed by depositing the many layers comprising the read sensor. Finally a second reader shield 506 is formed above a reader gap layer formed on top of the read sensor 502. The first step in forming the write head is the making of a first pole of the write head made above an insulation layer formed on top of the second reader shield 506.

Figure 6B:
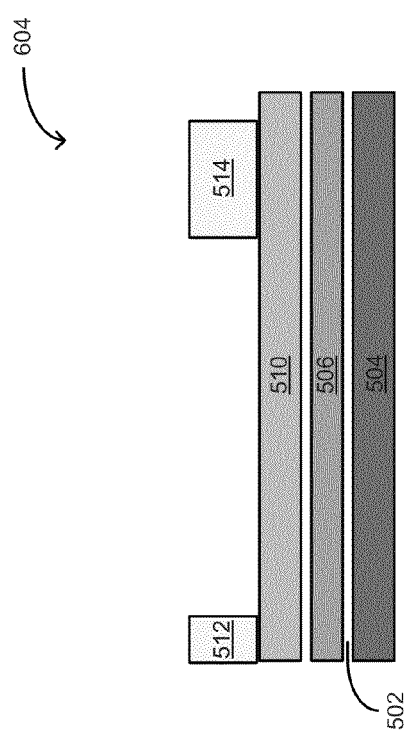

FIG. 6B shows step 604 where the P1 pedestal 512 and the back gap 514 are formed by plating, in one embodiment of the present invention. Both the P1 pedestal 512 and the back gap 514 are magnetically connected to the P1 pole 510.

Figure 6C:
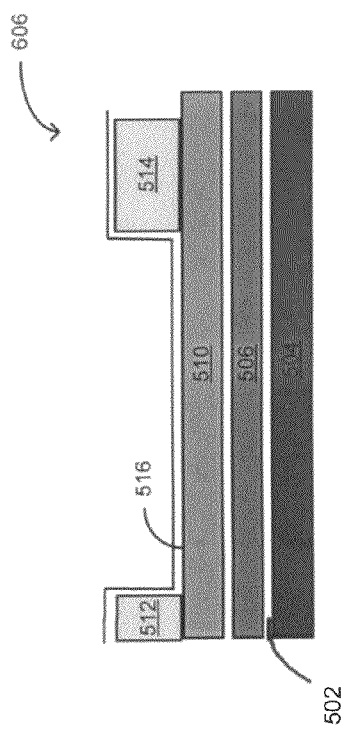

In FIG. 6C, at step 606, a dielectric insulator, such as an alumina gap, is deposited to form the insulation layer 516, at least partially covering the P1 pedestal, the back gap 514 and the exposed portion of P1 pole layer 510 between the P1 pedestal 512 and the back gap 514. The alumina gap layer 516 serves as an insulator to electrically isolate the coil turns that will be formed on top of the P1 pole layer 510 and may typically be 0.25 microns in thickness, although other thicknesses may be employed. In one embodiment, a typical thickness of the alumina gap is 0.1 to 0.5 microns. In one embodiment of the present invention, at step 606, a very thin seed layer may be deposited above the insulation layer 516, serving as a seed layer for the coil turns on top of the alumina. The seed layer (not shown here) may be made of Rhodium (Rd), copper or other appropriate materials, and may be about 0.04 to 0.15 microns in thickness.

Figure 6D:
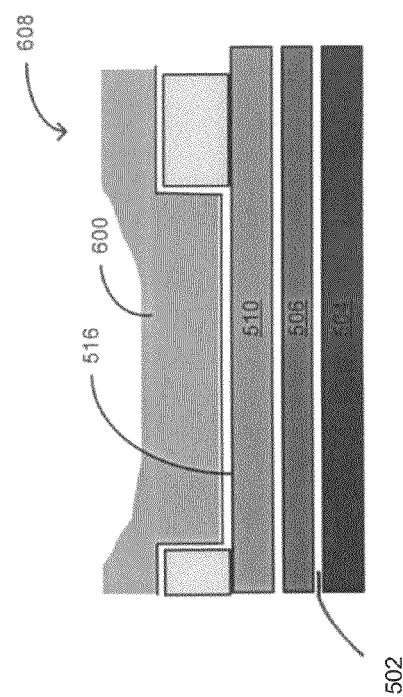

Next, in FIG. 6D, at step 608, a photoresist layer 600 is applied on top of the insulation layer 516 for the purpose of patterning/exposing the coil turns 518 (see FIG. 5), as will soon become apparent.

Figure 6E:
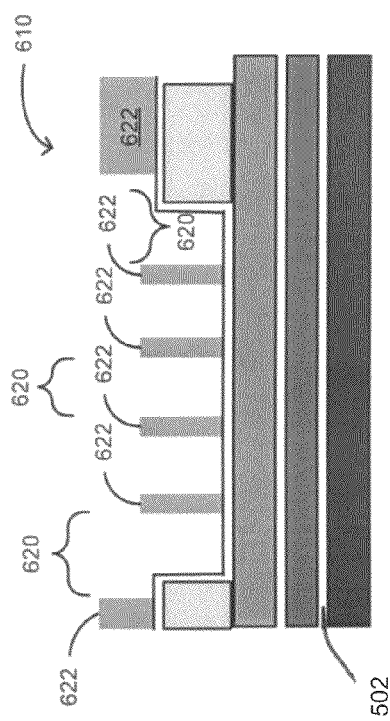

In FIG. 6E, at step 610, the photoresist layer 600 of FIG. 6D is exposed with the pattern for the coil turns and depending on whether positive or negative resist is used, the exposed or unexposed portions of the resist 600 are developed and dissolved away to form the pattern for the coil turns 518 (FIG. 5) within the resist 622. So the coil turns pattern is developed above the insulation layer 516, which is formed on top of the P1 pole layer 510, and at least partially on top of P1 pedestal 512 and the back gap layer 514. Additionally, the coil turns pattern 622 allows for a self-aligned coil with one or both the P1 pedestal 512 and the back gap 514. It should be noted that the distance between the first coil turn in coil turns pattern 622, as shown at 620 is very narrow, allowing for a larger first coil turn cross section and thus lower coil resistance. This occurs because more copper may be formed in the wider first coil turn. In at least in one embodiment, the first coil turn occupies at least partially an area under the P2 pole layer 526 (see FIG. 5).

Figure 6F:
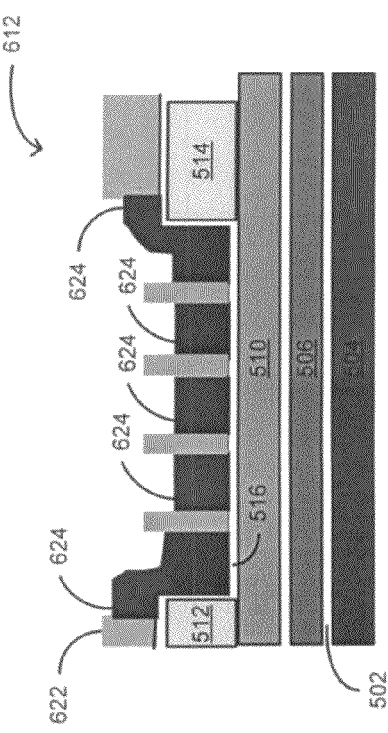

Next, at step 612 of FIG. 6F, copper coil 624 is plated wherever there is an opening in the photoresist 600, corresponding to the coil turns photoresist pattern 622. As may be apparent to the reader, the width of the copper coil 624 is increased and there is more conducting material (e.g copper) as compared to the prior art design of FIG. 2. In an example embodiment, this width increase is experienced to be 10-30%. An example of the width of each of the copper coil 624 plated in between two of the coil photoresist pattern 622 is known to be 0.5 to 4 microns. Furthermore, the coil 624 is self-aligned. The presence of the deposited coil conducting material at least partially above the P1 pedestal 512 and the back gap 514 allows for the coil 624 to be self-aligned with both the P1 pedestal 512 and the back gap 514, and further allowing the designer to take advantage of the maximum space available between the P1 pedestal 512 and the back gap 514.

Figure 6G:
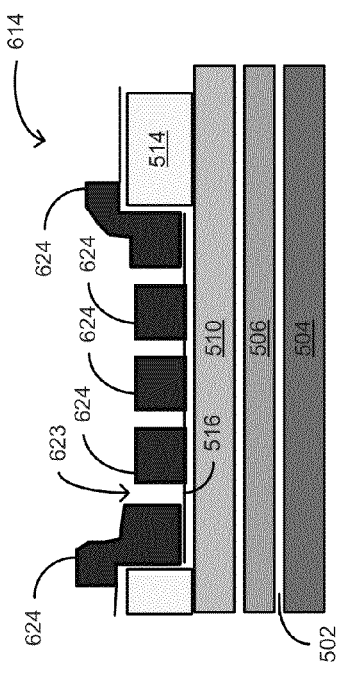

Next, at step 614 of FIG. 6G, the remaining portions of the coil turn photoresist layer 600 and the seed layer that were deposited at step 606 are removed. The remaining photoresist layer 622 may be removed using a solvent to dissolve the photoresist, and the seed layer may be removed using ion milling or an etching process. When the remaining photoresist layer 622 is removed, empty spaces 623 remain between turns of the copper coil 624.

Figure 6H:
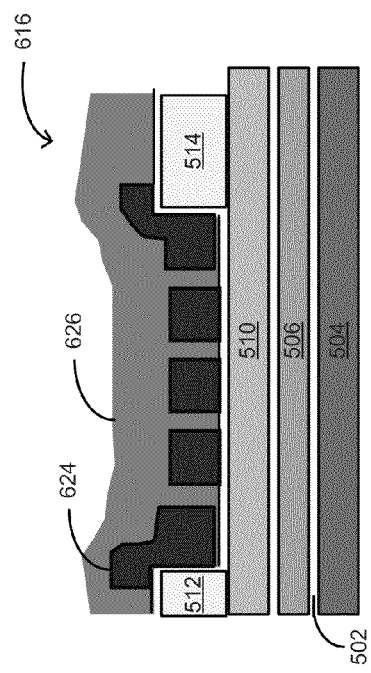

Next, at step 616 of FIG. 6H, an insulation layer 626, made typically of photoresist, is applied to fill the spaces 623 between the copper coil 624 and then hard baked, encapsulating the copper coil 624. This process is also commonly referred to as hard bake resist. An example of the baking temperatures is 200 to 280 Celsius. The photoresist in one embodiment is a liquid resist. The insulation layer 626 thus electrically isolates the coil turns from each other as well as from the other elements of the write head, e.g. the P2 pole (not shown in this figure).

Figure 6I:
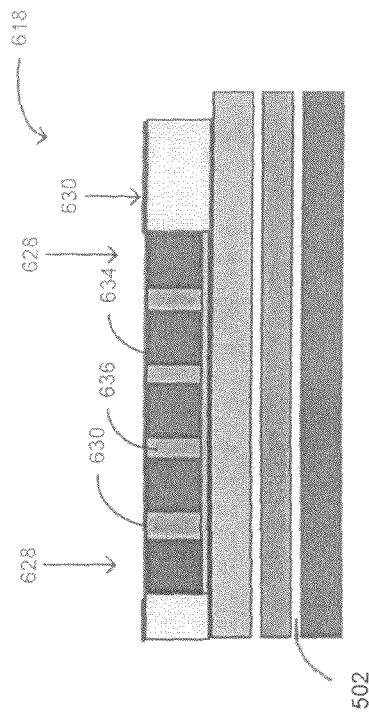

Next, at step 618 of FIG. 6I, alumina 630 is deposited on top of the hard bake photoresist 626, as well as everywhere in the field region to approximately the same height or level. The alumina 630 is a thick layer and is typically 2 to 4 microns. A Chemical Mechanical Polishing (CMP) process 628 is performed to planarize the top surface of the copper coil 624 and the insulation layer 626 of FIG. 6H. The goal of the manufacturing of the coil 628 is for the copper to take as much of the space between the P1 pedestal 512 and first back gap layer 514 as possible. Additionally, due to the position of the coil photoresist pattern 622 overlapping the P1 pedestal 512 and the first back gap layer 514, the coil 628 is self-aligned. The process described relative to FIGS. 6A-6I is less process and equipment intensive and thus more cost efficient and easier to implement than a damascene process of manufacturing coil turns in a write head 508.

Figure 7A:
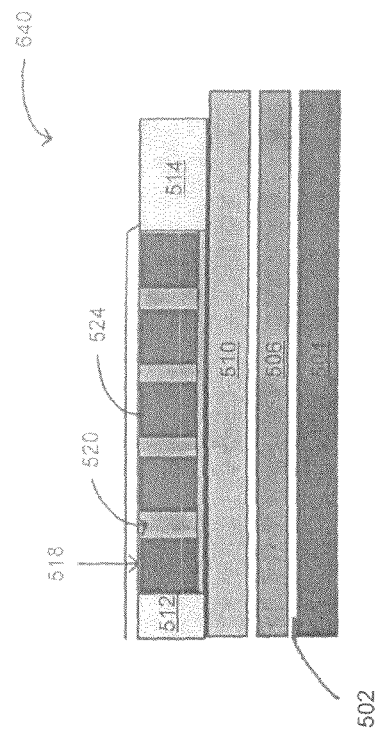
Figure 7B:
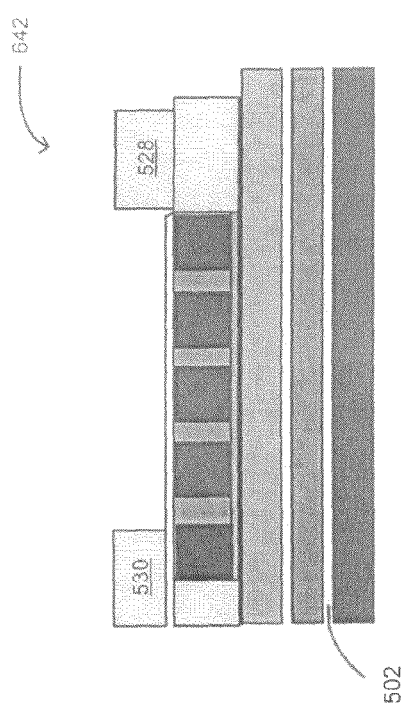
Figure 7C:
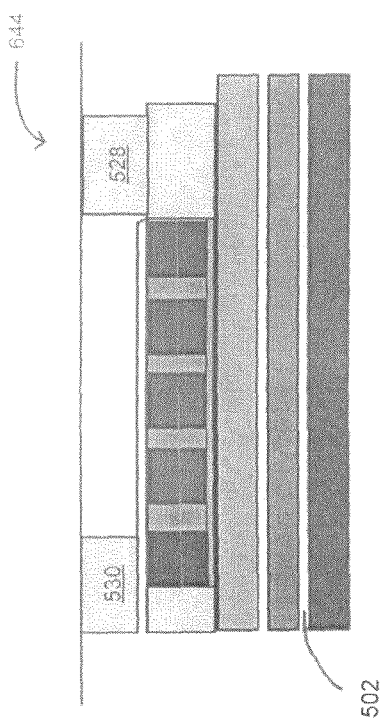

FIGS. 7A-7F show additional steps performed to complete the fabrication of the write head 508, and will be discussed briefly. In FIG. 7A, at step 640, the write gap 524 is deposited on top of the alumina that was deposited at step 618. No gap is deposited on the first back gap 514 to allow it to form a magnetic yoke circuit. Next, at step 642 of FIG. 7B, the P2 pole tip 530 and the second back gap layer 528 are formed on top of the write gap 524. Next, at step 644 of FIG. 7C, alumina is deposited and a CMP process is performed to planarize the top surface of the first coil 518 upon which the second coil 534 is formed so as to insulate the second coil 534. The coil 518 and the coil 534 are two layers of coil and either one layer or two layers of coil may be employed.

Next, at step 646 of FIG. 7D, the second coil 534 is formed of copper. Next, at step 648 of FIG. 7E, the insulation layer 536 is applied on top of the second coil 534 by a hard bake process similar to that discussed hereinabove. Next, at step 650 of FIG. 7F, a P3 pole magnetic layer 538 is formed, extending from the P2 pole tip 530 to the second back gap layer 528 completing the writer horse shoe loop and forming a complete yoke magnetic circuit.

Figure 8B:
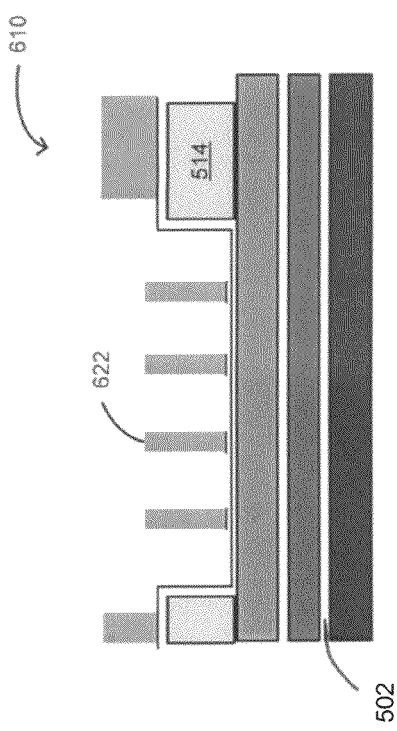
Figure 8C:
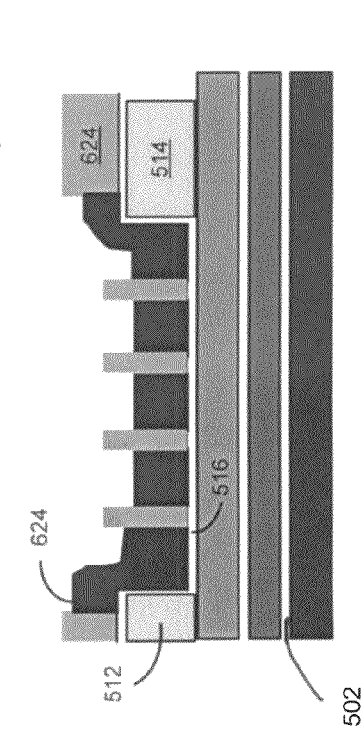
Figure 8D:
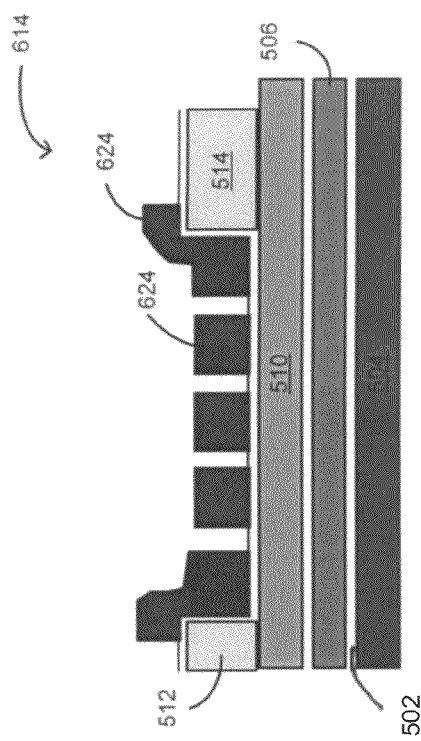
Figure 8E:
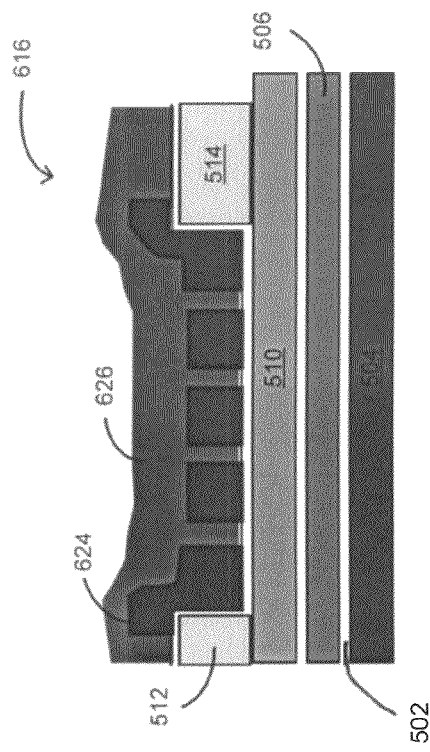
Figure 8F:
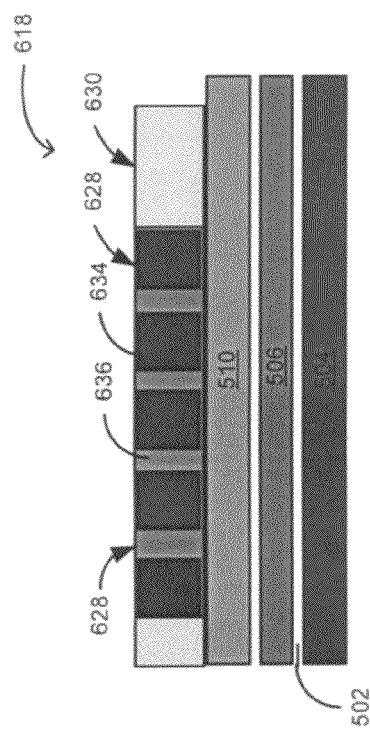
Figure 9A:
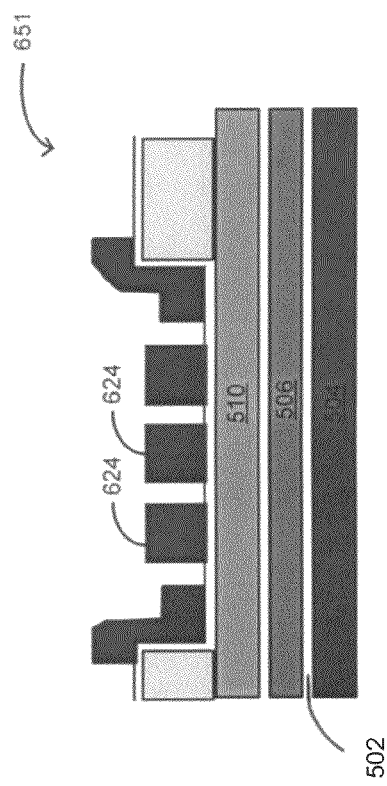
FIGS. 9A, 9B and 9C show alternative steps in manufacturing the write head 508.
Figure 9B:
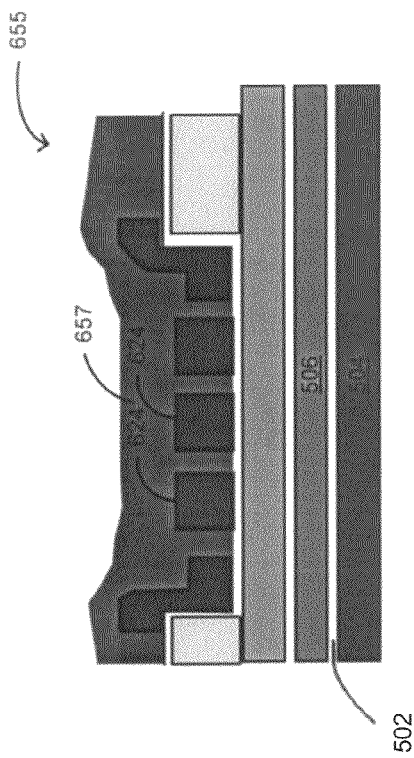
Figure 9C:
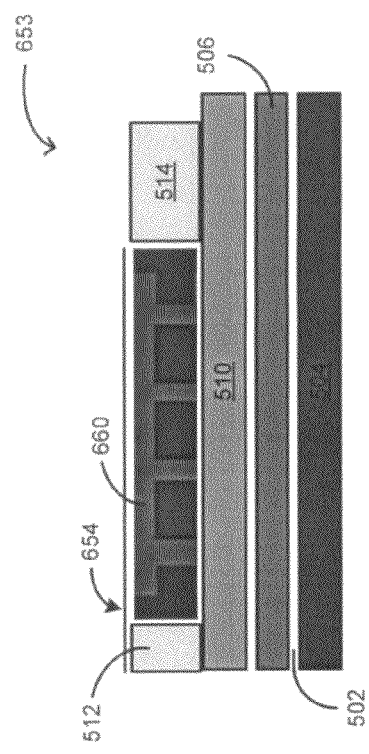

FIGS. 8A-8F are presented for a better understanding of an alternative method for fabrication of the coil 624 shown in FIGS. 9A-9C, which will now be discussed. Steps 608 and 610 of FIGS. 8A and 8B are performed, as previously discussed relative to FIGS. 6D and 6E, respectively. However, next, rather than performing step 612, step 651 of FIG. 9A is performed. At step 651, the copper coil 624 is plated lower than that of step 612 and almost all of the coil photoresist pattern 622 and the seed layer that resided on top of the P1 pedestal 512 and the first back gap layer 514 of FIG. 8B are removed. Next, at step 655, in FIG. 9B, hard bake resist insulation 657 is applied and then, at step 653 of FIG. 9C, an alumina layer 660 is deposited onto the copper coil 654 and a CMP process is applied to level the top of the alumina layer 660 and the copper coil 654. The step 616 is not performed. However, due to the position of the alumina layer 660, the cross section of the copper coil 654 is less than that of the embodiment discussed with reference to FIGS. 5, 6A-6I and 8A-8F thereby yielding higher coil resistance than the latter. It should be noted that the figures referred to herein are not drawn to scale.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of manufacturing a write head comprising:
   forming a P1 pedestal and a first back gap layer on top of a first pole P1 leaving a region between the first back gap layer and the first pole P1 layer for forming a coil, the first back gap layer formed at a distal end of the first pole P1;
   depositing a first insulation layer over at least a portion of the P1 pedestal, the first pole P1 and the first back gap layer and the region;
   depositing a coil photoresist layer on top of the first insulation layer;
   forming coil pockets in the coil photoresist layer;
   forming a coil by depositing copper in the coil pockets, wherein the coil has multiple turns;
   removing the coil photoresist layer to form spaces in between the coil turns;
   applying a second insulation layer to fill the spaces in between the coil turns;
   performing the step of hard baking the second insulation layer to encapsulate the coil;
   depositing alumina over the hard baked resist;
   performing a first chemical mechanical polishing (CMP) process;
   depositing a write gap on top of the coil, the second insulating layer, and the P1 pedestal and extending to an air bearing surface (ABS) at one end and over portions but not completely over a top surface of the first back gap layer at another end;
   forming a P2 pole tip on top of the write gap and at opposite end of the write gap, forming a second back gap on top of the first back gap;
   depositing alumina on the P2 pole tip and the second back gap layer;
   performing a second CMP process;
   forming a second coil layer;

applying a third insulation layer on top of the second coil layer; and forming a P3 magnetic layer on top of the second coil layer extending from the P2 pole tip to the second back gap layer.

2. A method of manufacturing as recited in claim 1, further comprising: removing excess deposited materials of the coil and the coil photoresist layer to form a planar surface.

3. A method of manufacturing as recited in claim 2 wherein the thickness of the first insulation layer behind the P1 pedestal is in the range of 0.1 to 0.5 microns.

4. A method of manufacturing as recited in claim 1, further comprising:

removing a coil seed layer before applying the second insulation layer, wherein the coil seed layer was deposited before applying the coil photoresist layer.

5. A method of manufacturing as recited in claim 1 wherein the third insulation layer is hard baked photoresist.

6. A method of manufacturing as recited in claim 1 wherein the thickness of each of the coil turns is in the range of 0.5 to 4 microns.

7. A method of manufacturing as recited in claim 1 wherein the coil is self-aligned with respect to the P1 pedestal.

8. A method of manufacturing as recited in claim 1 wherein the second coil layer is at least partially made of copper and further wherein the copper in the coil pockets is greater than the copper in second coil layer.

* * * * *